W. E. ANDREW.
RENDERING AND CLARIFYING FATS.
No. 172,942.            Patented Feb. 1, 1876.
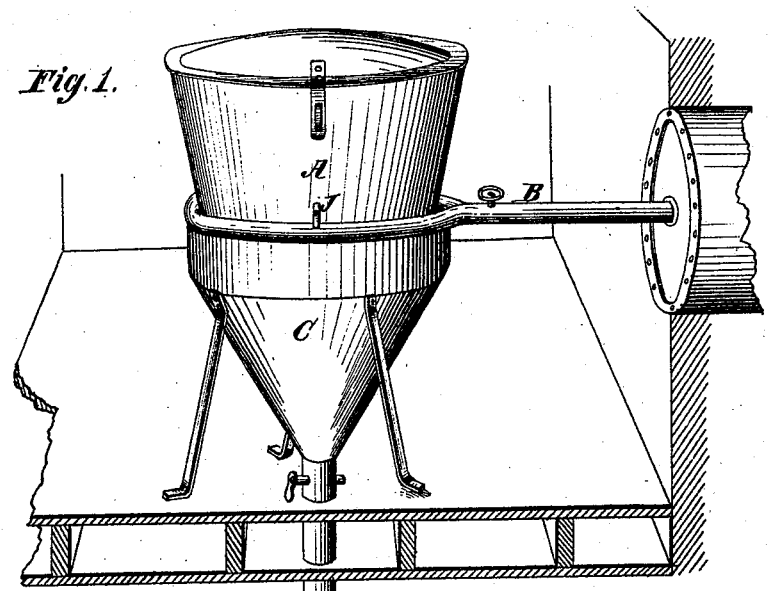
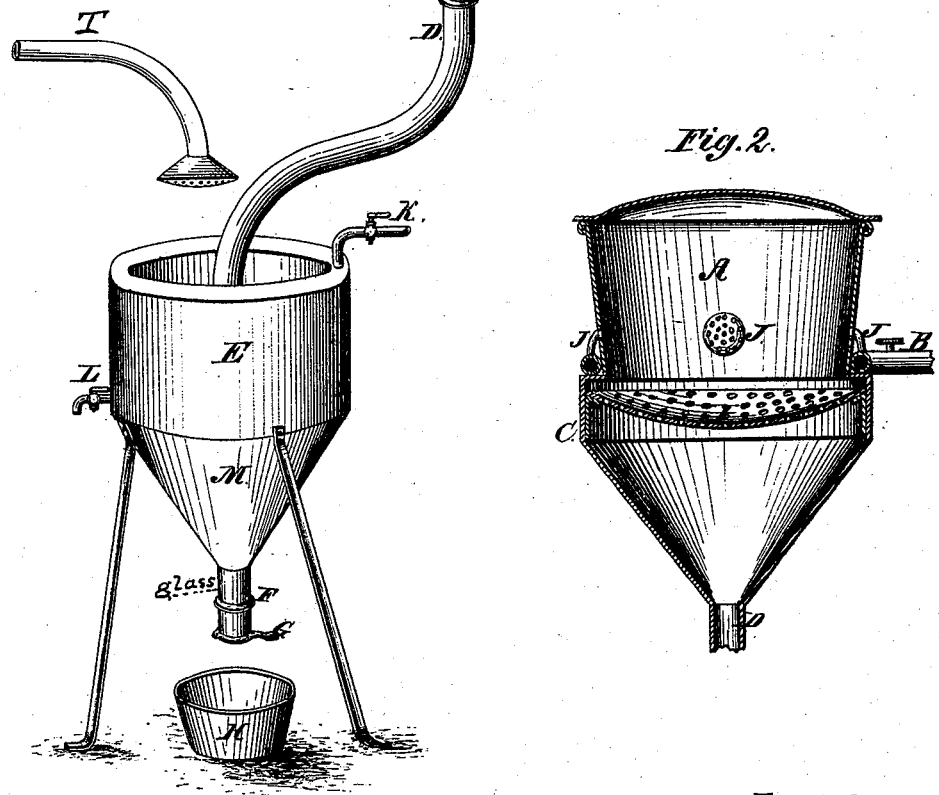
Witnesses.            Inventor.

UNITED STATES PATENT OFFICE.

WILLIAM E. ANDREW, OF NEW YORK, N. Y.

IMPROVEMENT IN RENDERING AND CLARIFYING FATS.

Specification forming part of Letters Patent No. 172,942, dated February 1, 1876; application filed December 10, 1875.

*To all whom it may concern:*

Be it known that I, WILLIAM E. ANDREW, of the city, county, and State of New York, have invented certain new and useful Improvements in a Process and Apparatus for Rendering and Clarifying Fats, of which the following is a specification:

To enable others to make and use my invention, I will fully describe what I consider the best manner and means of carrying out the same.

The nature of my invention relates to rendering and clarifying fats for various purposes, among which I especially name the caul or other fat of beeves, rendered and clarified for the purpose of combining the product with other ingredients in the manufacture of artificial butter.

The object of my invention, however, is to extract from animal fats an oil free from animal fiber, blood, animal odor or flavor, or any other deteriorating property.

My invention consists, first, in a rendering-vessel provided with a perforated bottom to carry off the liquid fat as fast as rendered, and with two or more induction-apertures in its sides for the induction of dry hot air or steam. Surrounding this rendering-vessel is a cylindrical belt, through which the hot air or steam passes, and it is provided with suitable pipes leading to the induction-apertures, and also with suitable connections to a steam-boiler or hot-air reservoir. Beneath the perforated bottom of the rendering-vessel is a receiving-chamber, made, preferably, in the form of an inverted cone, which receives the rendered fat as fast as it becomes liquid, and passes through the perforated bottom, and conveys it to a conveying-pipe, through which it passes to the clarifying-kettle, which will be hereinafter described. Second, in a glass outlet-tube situated at the bottom of the clarifying-vessel, by means of which the impurities of the oil may be discerned and the outflow of the same cut off as soon as the clarified oil appears in the glass tube. The clarifying-vessel is a jacket-kettle with a suitable connection, through which steam may be led to the chamber between the kettle and the jacket, and, as usual, it is provided with suitable means for letting off the condensed steam. A portion of this vessel is of the form of an inverted cone, and this portion leads to the glass tube. Beneath the glass tube is a stop-cock to allow of removing the impurities which are precipitated by means of my improved process, which will be described. The pure and clear oil may be drawn off through the glass tube, or other means may be employed—for instance, a stop-cock through the body of the jacket-kettle near the bottom thereof. (Not shown.) Third, in a clarifying process which consists in injecting into liquid fat taken direct from the rendering-vessel as fast as rendered, and held at a temperature of about 120° Fahrenheit in the clarifying-vessel, water which is heated to, at or about, 140° Fahrenheit, said water having been prepared with chloride of sodium or nitrate of potash, or both, and injected under force in the form of a mist or fine spray.

The approximately infinitesimal particles of the prepared water, heated as described, gravitate through the oil at every point, and take up the portions of blood, tissue, &c., held in the liquid fat, and carry the same to the bottom, from whence it may be removed.

I have discovered, by actual experiment, that in order to prevent the rendered oil from having an animal flavor or taste it is positively necessary that it should be removed as fast as rendered. When the oil remains in contact with the tissue in the rendering-vessel, fermentation usually occurs, and decomposition taints the product and depreciates its market value. I have also discovered that in order to procure a pure and clear oil, free from animal odor or taste, it is necessary that the complete operation of rendering and clarifying should be as nearly simultaneous as possible, and, to save time, labor, and expense, the processes should follow each other. To this end I have devised means for rendering, and conveying the oil as fast as rendered to a clarifying-vessel, and, by a peculiar process, separating and removing the impurities, and finally obtaining the pure oil, the whole being one continuous process for this purpose. The elaine, or pure oil, if used in the manufacture of artificial butter or cheese, must be perfectly free from animal taste or odor. In such case I select the finest beeves' fat, the caul preferred. It must be used while fresh and dry. It is put in an ordinary meat-hasher, and as fast as it is hashed it is placed in the rendering-vessel and subjected to the action of dry heat or superheated steam, when it will at once begin to melt and pass through the perforated bottom to and through a suitable pipe to a clarifying-vessel, where it is clarified and removed for use.

For the production of tallow or lard steam may be used in contact with the fat; but for elaine to be used in the manufacture of butter, or as a substitute for olive-oil, no water should be in contact with the fat until it reaches the clarifying-kettle.

It has long been a desideratum to thoroughly clarify and wash rendered fats, and various means have been resorted to for this purpose, such as agitation with water which has been treated with various chemicals; but in all such processes the intermingling of the water with the liquid fat has not been sufficiently complete, and a thorough washing consequently not obtained. By my improved process of using water heated to a higher degree of temperature than the oil, treating the same with substances to increase its specific gravity, and then injecting it in the form of a mist into the oil, I obtain very desirable results.

Having thus described my process, I will now explain the mechanical construction of my apparatus.

In the drawings, Figure 1 is an elevation of my invention, and Fig. 2 a sectional view.

Referring to the drawings, A represents the rendering-vessel, of any desired dimensions, and it is provided with clusters of small holes or heat-induction apertures, J J. These apertures may be of any number desired, and located at any place where the most desirable results may be obtained. The bottom of this rendering-vessel A is perforated, so that the fat, as fast as it becomes liquid, may pass through and become separated from the tissue, &c. B is a hollow belt or pipe, surrounding the rendering-vessel A, and it is provided with branch pipes corresponding to the induction-apertures J, and also with connection to the hot-air, superheated-steam, or steam reservoir. Through this belt and its branches the heat passes, and is introduced directly into the fat in the rendering-vessel. C is the receiver, made preferably in the form of an inverted cone, and this leads to a pipe or carrier, D, which conveys the rendered oil to the clarifier. E is the clarifying-vessel, having a chamber surrounding it, into which enters a steam-pipe. This vessel is in the form of a jacket-kettle, and is provided with suitable means for removing condensed steam. T is the rose, or other suitable means for forming the mist or fine spray of chemically-prepared water used in my improved process. Any other suitable equivalent device may be used which will atomize the water without departing from the gist of my invention. M is the lower portion of the clarifying-vessel, preferably of the form of an inverted cone, and properly attached to its smaller end is the glass tube F, through which is discerned the impurities which have been precipitated with the water, and the pure oil when the water has been drawn off in the vessel or tub H through the stop-cock G.

Two or more clarifying-vessels may be used, and the carrier be so constructed that it may lead to one while the clarifying process is being carried on in another. The means for injecting the spray may also be arranged so as to be shifted over any one of the series.

The operation is as follows: After hashing a quantity of the caul or other fat of beeves or other animals, say one ton, more or less, is placed in the rendering-vessel A, and heat introduced through the pipes and belt B into the hashed fat. Generally the rendering apparatus is situated in the story above the clarifying apparatus. As fast as the fat is melted it gravitates through the perforated bottom, and by way of the carrier D to the clarifying-vessel E. A stop-cock in the carrier D allows the operator to control the flow of rendered oil. When a sufficient quantity of rendered oil has been conveyed to the clarifying-vessel, a further flow is prevented, and the oil held at about 120° Fahrenheit by means of the steam-jacket. The chemically-prepared water, heated to about 140° Fahrenheit, is then, under force, injected into the mass in a fine spray or mist, which gravitates through the oil, and collects the blood, tissue, &c., and carries the same to the bottom, from whence it is drawn off by means of the cock G, until the pure clear oil is discerned through the glass tube I. The oil is then removed, allowed to cool sufficiently, and placed in bags in a suitable press, and subjected to pressure.

The process of employing this product in the manufacture of artificial butter is no part of this invention, but forms the subject-matter of another application.

The scraps may be removed from the rendering vessel, and subjected to pressure until all the oil is eliminated, and the scrap sold as scrap-cake.

I claim—

1. The combination of the rendering-vessel A, having the induction-apertures J J, and the perforated bottom, with the belt B and its branches, and with the receiver C, carrier D, and clarifying jacketed vessel E, as and for the purposes specified.

2. The combination of the clarifying jacketed vessel E and conical portion M with the glass tube I and cock G, substantially as specified.

3. The process of clarifying liquid tallow or oil, by injecting into the oil, under force, in the form of mist or fine spray, water prepared with chloride of sodium or nitrate of potash, and heated to a higher degree of temperature than the oil, substantially as and for the purposes specified.

In testimony whereof I have hereunto set my hand to this specification in the presence of two subscribing witnesses.

WILLIAM E. ANDREW.

Witnesses:
 NORTON A. HALBERT,
 P. Q. ECKERSON.